(12) United States Patent
Seong et al.

(10) Patent No.: US 12,535,835 B2
(45) Date of Patent: Jan. 27, 2026

(54) MACHINE LEARNING BASED UNMANNED AERIAL ANTI-TAMPERING TRIGGER SYSTEM DESIGN APPARATUS AND METHOD

(71) Applicant: AGENCY FOR DEFENSE DEVELOPMENT, Daejeon (KR)

(72) Inventors: Ki Eun Seong, Daejeon (KR); Justin Chanwook Jang, Daejeon (KR); Heesu Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 128 days.

(21) Appl. No.: 18/432,211

(22) Filed: Feb. 5, 2024

(65) Prior Publication Data

US 2025/0085723 A1    Mar. 13, 2025

(30) Foreign Application Priority Data

Sep. 8, 2023  (KR) .................. 10-2023-0119989

(51) Int. Cl.
*G05D 1/86* (2024.01)
*G05D 101/15* (2024.01)
*G05D 109/20* (2024.01)

(52) U.S. Cl.
CPC ........... *G05D 1/86* (2024.01); *G05D 2101/15* (2024.01); *G05D 2109/20* (2024.01)

(58) Field of Classification Search
CPC .. G05D 1/86; G05D 2101/15; G05D 2109/20; G09B 9/003; G06N 20/00
See application file for complete search history.

(56) References Cited

U.S. PATENT DOCUMENTS

2008/0147366 A1* 6/2008 Schutz .................... G06T 17/05
                                                                    703/8
2021/0081592 A1* 3/2021 Dandy .................... G06N 20/00
(Continued)

FOREIGN PATENT DOCUMENTS

CN    119720779 A  *  3/2025
JP        7240248      3/2023
(Continued)

OTHER PUBLICATIONS

Machine translation of CN-119720779-A retrieved from Clarivate Analytics on Aug. 9, 2025 (Year: 2025).*

*Primary Examiner* — Thomas Ingram
(74) *Attorney, Agent, or Firm* — LEX IP MEISTER, PLLC

(57) ABSTRACT

An anti-tampering trigger system design apparatus includes an equipment simulation device that generates driving simulation data by simulating data output by equipment that is mounted on an unmanned aerial vehicle, a virtual unmanned aerial vehicle simulation device that generates a function result value by simulating a function of the unmanned aerial vehicle based on the driving simulation data, and generates a mission result value by simulating mission performance of the unmanned aerial vehicle using the function of the simulated unmanned aerial vehicle, and a machine learning device that performs machine learning of an anti-tampering trigger using the driving simulation data, the function result value, and the mission result value.

13 Claims, 7 Drawing Sheets

(56) References Cited

U.S. PATENT DOCUMENTS

| | | | |
|---|---|---|---|
| 2023/0252206 A1* | 8/2023 | Byar | G06F 30/15 |
| | | | 703/6 |
| 2025/0085723 A1* | 3/2025 | Seong | G06N 20/00 |
| 2025/0252427 A1* | 8/2025 | Sampath | G06Q 50/26 |

FOREIGN PATENT DOCUMENTS

| KR | 10-2203617 | 1/2021 |
| KR | 10-2021-0126865 | 10/2021 |
| KR | 10-2366922 | 2/2022 |
| KR | 10-2455003 | 10/2022 |
| KR | 10-2023-0048110 | 4/2023 |

\* cited by examiner

MACHINE LEARNING BASED UNMANNED AERIAL ANTI-TAMPERING TRIGGER SYSTEM DESIGN APPARATUS AND METHOD

CROSS-REFERENCE TO RELATED APPLICATION

This application claims priority to and the benefit of Korean Patent Application No. 10-2023-0119989 filed in the Korean Intellectual Property Office on Sep. 8, 2023, the entire contents of which are incorporated herein by reference.

BACKGROUND (a) Field

Embodiments of the present disclosure relates to a machine learning based unmanned aerial anti-tampering trigger system design apparatus and method.

(b) Description of the Related Art

An unmanned aerial system generally includes unmanned aerial vehicle, a data link system, and a ground control system. The unmanned aerial system is much more complex and includes more equipment than manned aerial vehicle. It is realistically impossible for a pilot to fully understand such a complex system structure. In addition, a pilot does not need to have detailed knowledge of the structure and equipment of all systems to perform a mission. In complex systems such as unmanned aerial systems, failure may occur frequently, and when such failure occurs, it is difficult to determine ripple effects of the failure. In the manned aerial vehicle, since a pilot is directly on board, conditions of an airframe may be diagnosed relatively more accurately compared to the unmanned aerial vehicle when specific equipment fails. However, since the pilot of the unmanned aerial vehicle controls the airframe from a ground control system, there is a limit to understanding the overall system status using only camera video information and equipment status information. Therefore, a system for assisting a pilot is needed.

When an unmanned aerial vehicle fails during a mission, it is difficult for a pilot to determine whether the failure makes it impossible to return to base. When the unmanned aerial vehicle is flying over enemy territory and it is impossible to return to base, important data should be deleted to prevent the important data of the unmanned aerial vehicle from being stolen by the enemy. Anti-tampering is a technology to protect important data. It is burdensome for a pilot to determine whether to trigger anti-tampering in the complex unmanned aerial system. Therefore, there is a need for a system that identifies the impact of a specific equipment failure on the entire system through machine learning and triggers anti-tampering when the return to base is impossible due to the failure.

Recently, the effectiveness of the machine learning has been proven and is being used across industries. The machine learning is generating a determination model using countless data. The key to the machine learning performance lies in data. It is difficult to generate vast and diverse data for machine learning using actual unmanned aerial vehicles. In the actual unmanned aerial vehicle, failure may not occur arbitrarily, and it is impossible to fly with broken equipment. The generation and use of failure data determines whether the machine learning may be applied to an unmanned aerial system.

For the system that triggers the anti-tampering of the unmanned aerial vehicle, a system that generates failure data, a system that may simulate flight situations, and a system that models machine learning are needed.

SUMMARY

Embodiments of the present disclosure attempts to provide a machine learning based unmanned aerial anti-tampering trigger system design apparatus and method.

According to an embodiment of the present disclosure, an anti-tampering trigger system design apparatus includes an equipment simulation device that generates driving simulation data by simulating data output by equipment that is mounted on an unmanned aerial vehicle, a virtual unmanned aerial vehicle simulation device that generates a function result value by simulating a function of the unmanned aerial vehicle based on the driving simulation data, and generates a mission result value by simulating mission performance of the unmanned aerial vehicle using the function of the simulated unmanned aerial vehicle, and a machine learning device that performs machine learning of an anti-tampering trigger using the driving simulation data, the function result value, and the mission result value.

The equipment simulation device may include an actual equipment group that includes a plurality of pieces of actual equipment that are mounted on the unmanned aerial vehicle, and a model equipment group that includes a plurality of pieces of model equipment that perform the same function corresponding to the actual equipment group.

The equipment simulation device may further include a failure simulator that outputs collection information that collects normal data and failure data received from the plurality of pieces of model equipment belonging to the model equipment group, and a system integration unit that generates the driving simulation data by combining output data of the plurality of pieces of actual equipment belonging to the actual equipment group and the collected information.

Each of the plurality of pieces of model equipment may include a normal data output unit that generates the normal data within a range that the actual equipment outputs and outputs the generated normal data to the failure simulator, and a failure simulation unit that generates failure data exceeding the range that the actual equipment outputs and outputs the generated failure data to the failure simulator.

Each of the plurality of pieces of model equipment may further include a data conversion unit that changes a value of the failure data generated by the failure simulation unit and outputs the changed value, and the failure simulator may transmit data information to be changed according to a request from the machine learning device to the data conversion unit of corresponding model equipment among the plurality of pieces of model equipment.

The machine learning device may include an input layer that receives the driving simulation data as a plurality of input data, a functional layer that receives the function result values as the plurality of functions of the unmanned aerial vehicle, and a mission layer that receives the mission result value as the mission of the unmanned aerial vehicle.

The input layer and the functional layer may be fully connected, and the functional layer and the mission layer may be fully connected, and the machine learning device may determine whether to use the plurality of input data by adjusting weight values for the plurality of functions and determine whether to use the plurality of functions by adjusting a weight value for the mission.

The machine learning device may derive an anti-tampering trigger model by repeatedly learning the process of adjusting weight values of the input layer, the functional layer, and the mission layer using a supervised learning method.

According to another embodiment of the present disclosure, an anti-tampering trigger system design method for deriving an anti-tampering trigger model includes generating, by an equipment simulation device, driving simulation data by simulating data output by equipment that is mounted on an unmanned aerial vehicle, generating, by a virtual unmanned aerial vehicle simulation device, a function result value by simulating a function of the unmanned aerial vehicle based on the driving simulation data, and generating a mission result value by simulating mission performance of the unmanned aerial vehicle using the function of the simulated unmanned aerial vehicle, and performing, by a machine learning device, machine learning of an anti-tampering trigger using the driving simulation data, the function result value, and the mission result value.

The equipment simulation device may generate normal data within a range that actual equipment outputs and failure data that exceeds the range that the actual equipment outputs, and generate the driving simulation data by combining output data of a plurality of pieces of actual equipment that are mounted on the unmanned aerial vehicle, normal data and the failure data.

The equipment simulation device may output a change in a value of the failure data according to a request from the machine learning device, and the machine learning device may receive the changed failure data and re-perform the machine learning of the anti-tampering trigger.

The machine learning device may include an input layer that receives the driving simulation data as a plurality of input data, a functional layer that receives the function result values as the plurality of functions of the unmanned aerial vehicle, and a mission layer that receives the mission result value as the mission of the unmanned aerial vehicle.

The input layer and the functional layer may be fully connected, and the functional layer and the mission layer may be fully connected, and the machine learning device may determine whether to use the plurality of input data by adjusting weight values for the plurality of functions and determine whether to use the plurality of functions by adjusting a weight value for the mission.

The machine learning device may derive an anti-tampering trigger model by repeatedly learning the process of adjusting weight values of the input layer, the functional layer, and the mission layer using a supervised learning method.

According to still another embodiment of the present disclosure, an anti-tampering trigger system design method includes inputting driving simulation data generated by simulating data output by equipment that is mounted on an unmanned aerial vehicle to an input layer as a plurality of input data, inputting a function result value generated by simulating a function of the unmanned aerial vehicle based on the driving simulation data to a functional layer as a plurality of functions, inputting a mission result value generated by simulating mission performance of the simulated unmanned aerial vehicle using the function of the simulated unmanned aerial vehicle to a mission layer as the mission of the unmanned aerial vehicle, and deriving an anti-tampering trigger model by repeatedly learning the process of adjusting weight values of the input layer, the functional layer, and the mission layer using a supervised learning method.

The input layer and the functional layer may be fully connected, and the functional layer and the mission layer may be fully connected.

The driving simulation data may include normal data within a range that the actual equipment outputs and failure data that exceeds the range that the actual equipment outputs.

According to the machine learning based unmanned aerial anti-tampering trigger system design apparatus and method according to an embodiment of the present disclosure, it is possible to design an unmanned aerial anti-tampering trigger model by simulating various failure situations.

The unmanned aerial vehicle equipped with the anti-tampering trigger model designed for various failure situations can determine on its own a situation in which the unmanned aerial vehicle cannot return to base and trigger the anti-tampering, and can quickly protect the important data of the unmanned aerial vehicle in emergency situations.

DETAILED DESCRIPTION

Figure 1:
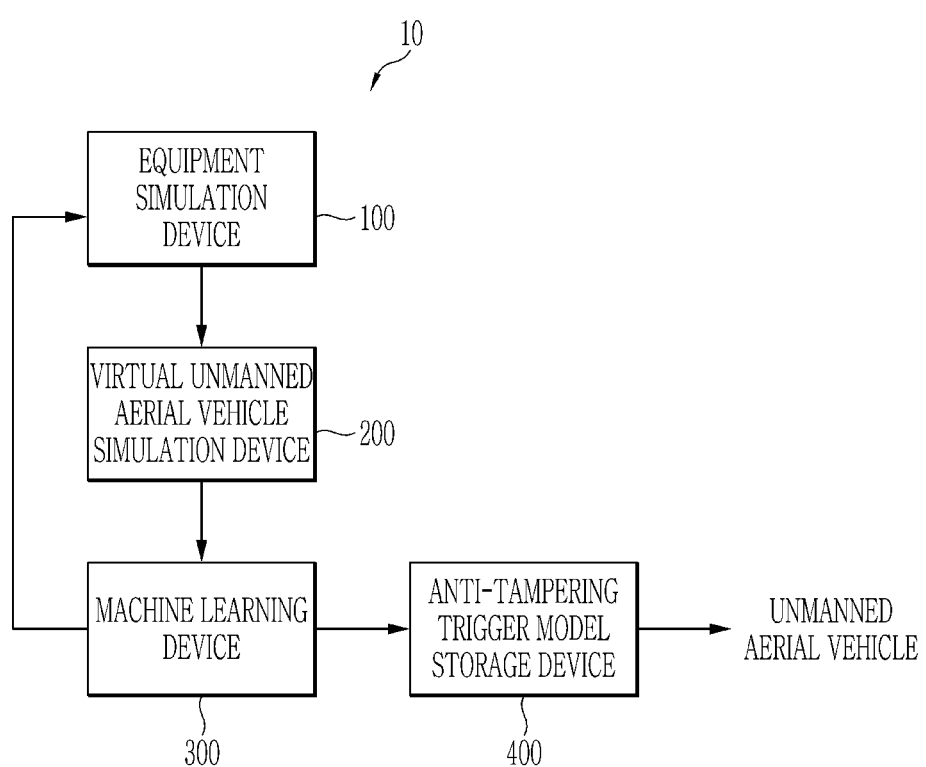
FIG. 1 is a block diagram illustrating a machine learning based unmanned aerial anti-tampering trigger system design apparatus according to an embodiment of the present disclosure.

Hereinafter, exemplary embodiments of the present invention will be described in detail with reference to the accompanying drawings so that those skilled in the art to which the present invention pertains may easily practice the present invention. However, the present invention may be implemented in various different forms and is not limited to exemplary embodiments provided herein.

Portions unrelated to the description will be omitted in order to obviously describe the present invention, and similar components will be denoted by the same reference numerals throughout the present specification.

In addition, unless explicitly described to the contrary, the word "comprise", and variations such as "comprises" or "comprising", will be understood to imply the inclusion of stated elements but not the exclusion of any other elements.

Hereinafter, a machine learning based unmanned aerial anti-tampering trigger system design apparatus and method according to an embodiment of the present disclosure will be described with reference to FIGS. 1 to 6.

FIG. 1 is a block diagram illustrating a machine learning based unmanned aerial anti-tampering trigger system design apparatus according to an embodiment of the present disclosure.

Referring to FIG. 1, an anti-tampering trigger system design apparatus 10 according to an embodiment of the present disclosure may include an equipment simulation device 100, a virtual unmanned aerial vehicle simulation device 200, a machine learning device 300, and an anti-tampering trigger model storage device 400. 도 The anti-tampering trigger system design apparatus 10 may be applied to a design of an anti-tampering trigger system of various types of unmanned aerial vehicles, such as an unmanned vehicle, an unmanned surface vessel, and an unmanned submarine, as well as a design of an anti-tampering trigger system of an unmanned aerial vehicle.

The equipment simulation device 100 and the virtual unmanned aerial vehicle simulation device 200 generate data necessary for machine learning of anti-tampering trigger. That is, result values (output values) of the equipment simulation device 100 and the virtual unmanned aerial vehicle simulation device 200 are input to the machine learning device 300.

The machine learning device 300 may perform the machine learning of the anti-tampering trigger using input information. The machine learning device 300 may derive an anti-tampering trigger model through the machine learning.

The anti-tampering trigger model storage device 400 may store the anti-tampering trigger model derived through the machine learning and mount the anti-tampering trigger model on the unmanned aerial vehicle. Based on the anti-tampering trigger model mounted on the unmanned aerial vehicle, the anti-tampering may be activated by determining a situation in which return to base is impossible in an actual flight environment.

Figure 2:
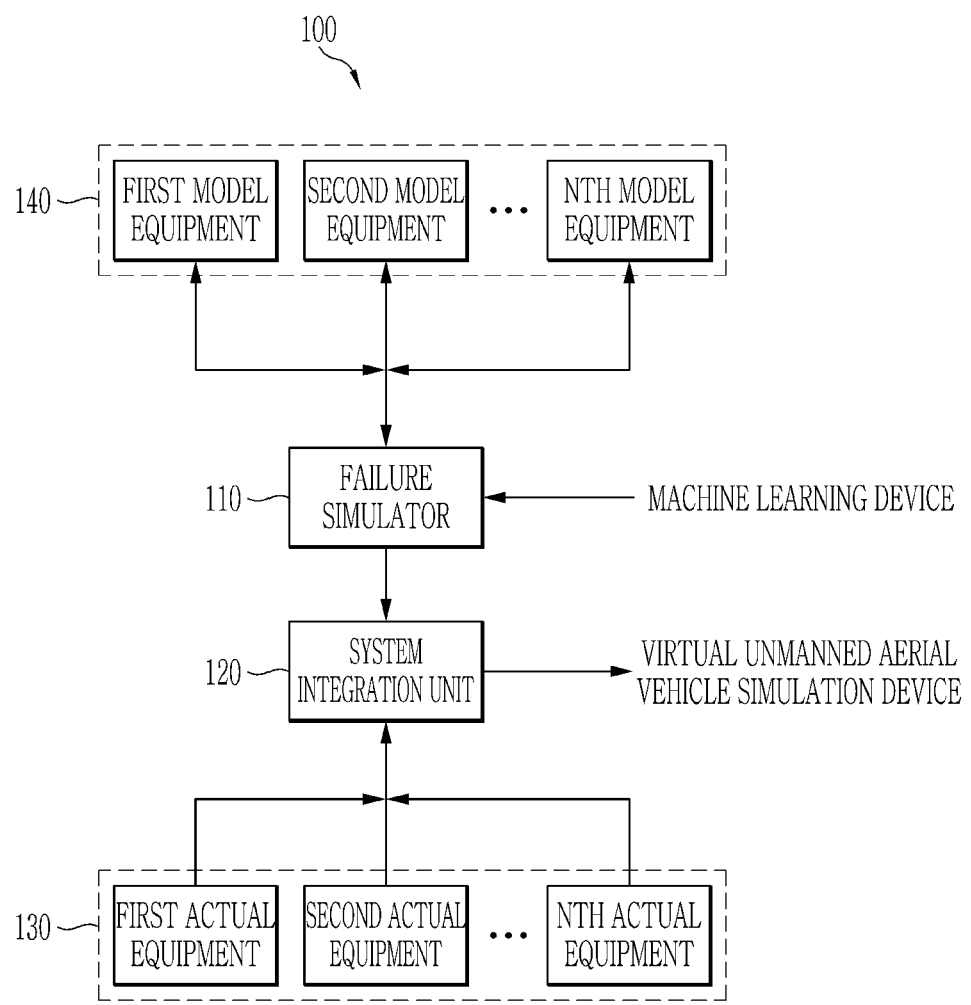
FIG. 2 is a block diagram illustrating the equipment simulation device of FIG. 1.
Figure 3:
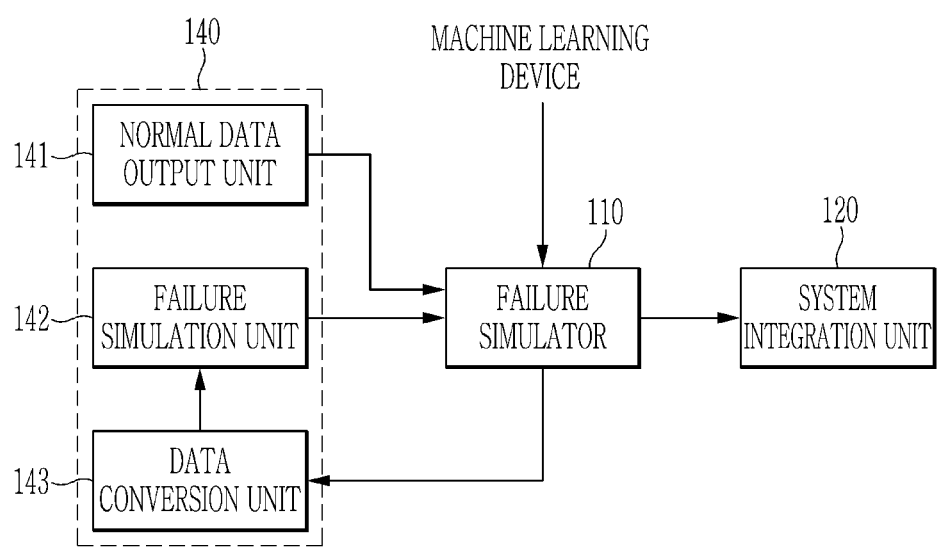
FIG. 3 is a block diagram for describing a method in which the equipment simulation device of FIG. 2 simulates failure.

FIG. 2 is a block diagram illustrating the equipment simulation device of FIG. 1. FIG. 3 is a block diagram for describing a method in which the equipment simulation device of FIG. 2 simulates failure.

Referring to FIGS. 2 and 3, the equipment simulation device 100 may include a failure simulator 110, a system integration unit 120, an actual equipment group 130, and a model equipment group 140. The equipment simulation device 100 may selectively drive the actual equipment group 130 or the model equipment group 140 to generate data for the machine learning of the anti-tampering trigger.

The actual equipment group 130 may include a plurality of pieces of actual equipment that may actually be mounted on the unmanned aerial vehicle. That is, the actual equipment group 130 may include pieces of first to Nth actual equipment that perform the operations and functions of the unmanned aerial vehicle. N is an integer greater than or equal to 2.

The model equipment group 140 may include a plurality of pieces of model equipment that perform the same function corresponding to the actual equipment group 130. That is, the model equipment group 140 may include pieces of first to Nth model equipment corresponding to the pieces of first to Nth actual equipment that perform the operations and functions of the unmanned aerial vehicle.

Each of the pieces of first to Nth model equipment may include a normal data output unit 141, a failure simulation unit 142, and a data conversion unit 143, as illustrated in FIG. 3. FIG. 3 illustrates any one of the pieces of first to Nth model equipment.

The normal data output unit 141 may generate normal data within a range that the actual equipment may normally output and output the generated normal data to the failure simulator 110.

The failure simulation unit 142 may generate failure data that exceeds the range that the actual equipment may normally output and output the generated failure data to the failure simulator 110.

The model equipment may use the normal data output unit 141 and the failure simulation unit 142 to simulate the case where some of the functions of one model equipment fail, that is, the situation where the state of the model equipment is normal, but a specific data value shows an abnormal phenomenon. That is, the normal data output unit 141 outputs the normal data to the failure simulator 110, and the failure simulation unit 142 outputs the failure data to the failure simulator 110, thereby simulating the case where some functions of the model equipment fail.

Alternatively, the model equipment may simulate the case where the entire function of one model equipment fails. In this case, the normal data output unit 141 does not output the normal data, and the failure simulation unit 142 may output the failure data to the failure simulator 110 or may not output the failure data.

The failure simulator 110 may collect information (normal data and failure data) received from the pieces of first to Nth model equipment belonging to the model equipment group 140, and output the collected information to the system integration unit 120.

Meanwhile, the machine learning device 300 may use input information to learn and determine the anti-tampering trigger, and the reliability of the anti-tampering trigger model may increase only when a large amount of data is used for learning. To this end, the machine learning device 300 may play the role of generating data to be used for learning. That is, the machine learning device 300 may request the failure simulator 110 to change some data among the input information to generate data to be used for learning.

The failure simulator 110 may transmit the data information to be changed according to the request of the machine learning device 300 to the data conversion unit 143 of the corresponding model equipment among the pieces of first to Nth model equipment. The data conversion unit 143 may change and output the value of the failure data generated by the failure simulation unit 142 according to the data information to be changed.

The machine learning device 300 may receive the changed failure data and re-perform the learning and determination of the anti-tampering trigger, and may increase the reliability of the anti-tampering trigger model. In both the case where some of the functions of the plurality of pieces of model equipment fail and case where all functions of one model equipment fail, the machine learning device 300 may re-perform the learning and determination of the anti-tampering triggers by requesting the change in the data to be used for learning.

The system integration unit 120 may receive collection information of the pieces of first to Nth model equipment from the failure simulator 110, receive the output data of the pieces of first to Nth actual equipment belonging to the actual equipment group 130, and generate driving simulation data by combining the collected information and output data and transmit the generated driving simulation data to the virtual unmanned aerial vehicle simulation device 200.

In this way, the equipment simulation device 100 may generate the driving simulation data by simulating data that may be output by the equipment that may be mounted on the unmanned aerial vehicle.

Figure 4:
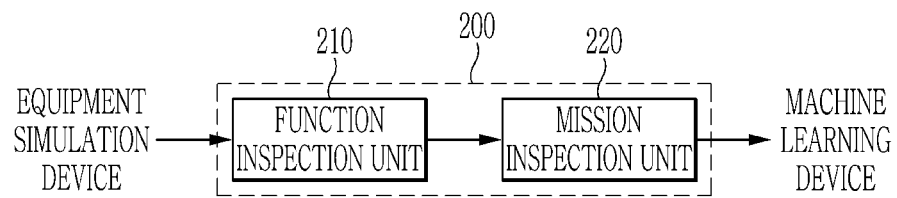
FIG. 4 is a block diagram illustrating a virtual unmanned aerial vehicle simulation device of FIG. 1.

FIG. 4 is a block diagram illustrating a virtual unmanned aerial vehicle simulation device of FIG. 1.

Referring to FIG. 4, the virtual unmanned aerial vehicle simulation device 200 may sequentially determine whether the unmanned aerial vehicle may drive normally and perform its mission normally based on the driving simulation data transmitted from the equipment simulation device 100. To this end, the virtual unmanned aerial vehicle simulation device 200 may include a function inspection unit 210 and a mission inspection unit 220.

The function inspection unit 210 may simulate the function of the unmanned aerial vehicle based on the driving simulation data to determine whether the unmanned aerial vehicle may operate normally, thereby generating a function result value.

The mission inspection unit 220 may determine whether the mission may be performed normally by simulating the mission performance of the unmanned aerial vehicle using the functions of the simulated unmanned aerial vehicle based on the driving simulation data to generate a mission result value.

The virtual unmanned aerial vehicle simulation device 200 may transmit the driving simulation data transmitted from the equipment simulation device 100, the function result value simulating the functions of the unmanned aerial vehicle, and the mission result value simulating the mission performance of the unmanned aerial vehicle to the machine learning device 300.

Figure 5:
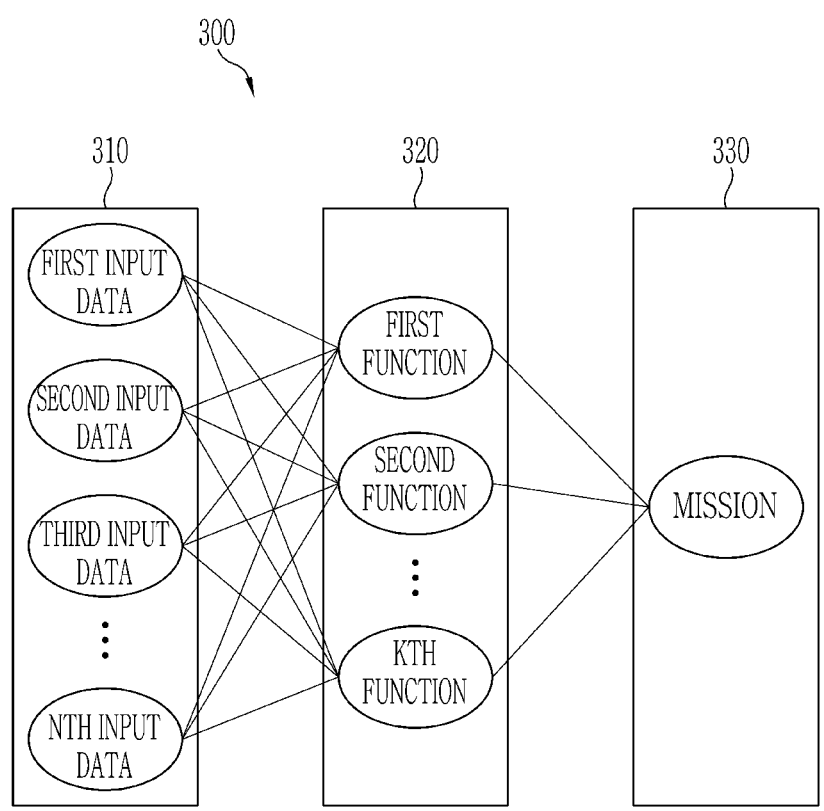
FIG. 5 is a block diagram illustrating a machine learning device of FIG. 1.

FIG. 5 is a block diagram illustrating a machine learning device of FIG. 1.

Referring to FIG. 5, the machine learning device 300 may perform the machine learning of the anti-tampering trigger using the driving simulation data, the function result value, and the mission result value. To this end, the machine learning device 300 may include an input layer 310, a functional layer 320, and a mission layer 330.

The input layer 310 receives the driving simulation data. That is, the information (normal data and failure data) of the pieces of first to Nth model equipment belonging to the model equipment group 140 and the output data of the pieces of first to Nth actual equipment may be input to the input layer 310. The driving simulation data may be input to the input layer 310 as the plurality of input data (first to nth input data).

The functional layer 320 receives the function result value that simulates the functions of the unmanned aerial vehicle. That is, the function result value simulating the function of the unmanned aerial vehicle may be input to the functional layer 320 as the plurality of functions (first to kth functions) of the unmanned aerial vehicle.

The types of input data used in the input layer 310 may vary depending on the specific function, but the input layer 310 and the functional layer 320 are fully-connected, and the machine learning device 300 may determine whether to use the plurality of input data by adjusting weight values for the plurality of functions.

The mission layer 330 may receive the mission result value simulating the mission performance of the unmanned aerial vehicle as the mission of the unmanned aerial vehicle. The functional layer 320 and the mission layer 330 are also fully connected, and the machine learning device 300 may determine whether to use the plurality of functions by adjusting a weight value for the mission.

The machine learning device 300 may learn using a supervised learning method. In other words, the machine learning device 300 receives the driving simulation data from the equipment simulation device 100, receives the function result value and the mission result value from the virtual unmanned aerial vehicle simulation device 200, and select initial weight values of each layer 310, 320, and 330 using the results in the normal state of all the pieces of equipment. Based on the results of simulating failures for each equipment in the equipment simulation device 100 and determining whether the mission has been achieved in the virtual unmanned aerial vehicle simulation device 200 when the failure occurs, the machine learning device 300 may finally determine the weight values of each layer 310, 320, and 330 and derive the anti-tampering trigger model by repeatedly learning the process of adjusting the weight values of each layer 310, 320, and 330.

Figure 6:
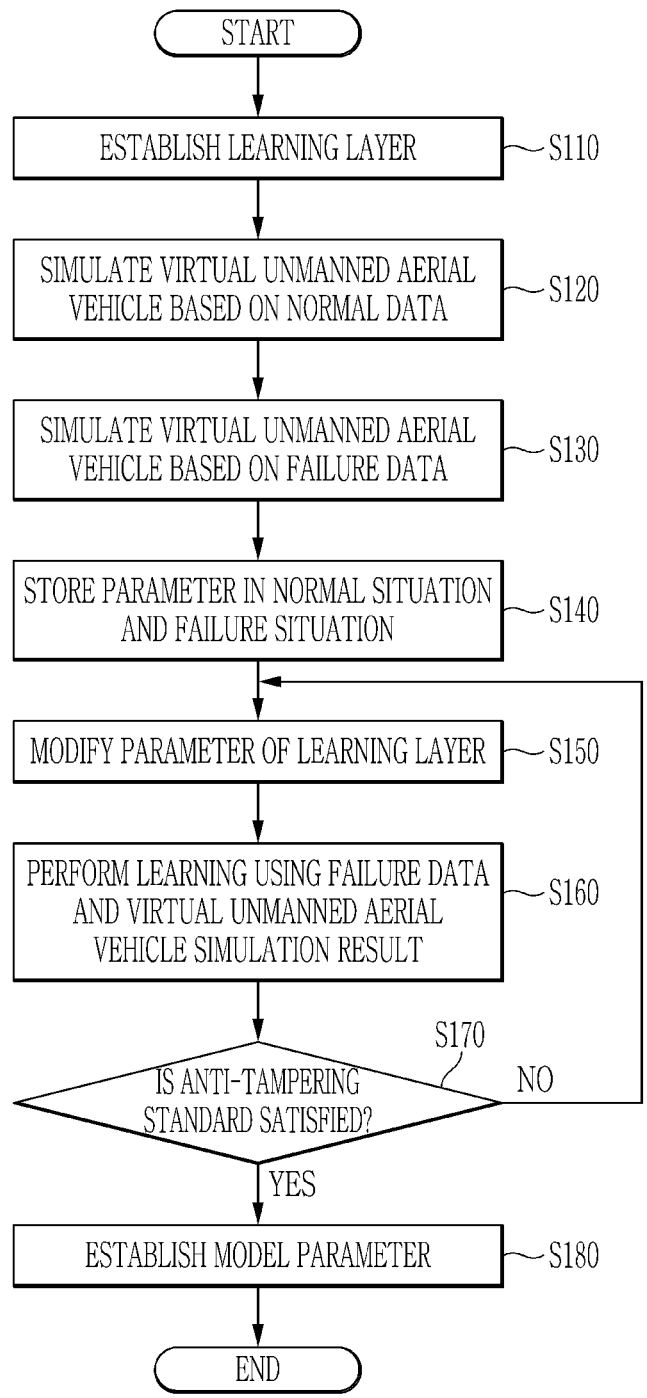
FIG. 6 is a flowchart illustrating a process in which the machine learning device of FIG. 5 performs machine learning.

FIG. 6 is a flowchart illustrating a process in which the machine learning device of FIG. 5 performs machine learning.

Referring to FIG. 6, the machine learning device 300 may establish a learning layer (input layer, functional layer, and mission layer) to derive the anti-tampering trigger model (S110). That is, the machine learning device 300 may define all the input data used within the system, sequentially define the functions and missions of the system based on the input data, and set initial model parameters of the learning layer.

After the learning layer is formed, the machine learning device 300 may perform the virtual unmanned aerial vehicle simulation based on the normal data (S120). Then, a virtual unmanned aerial vehicle simulation is performed based on the failure data (S130).

The machine learning device 300 may store parameters of a normal situation, which are the results of performing the virtual unmanned aerial vehicle simulation based on the normal data, and parameters of the failure situation, which are the results of performing the virtual unmanned aerial vehicle simulation based on failure data (S140).

When data to be used for supervised learning is derived, the machine learning device 300 may perform learning and modify the parameters of the learning layer (S150).

The machine learning device 300 may reflect the modified parameters in the learning layer and perform the learning using the failure data and unmanned aerial vehicle simulation results (S160).

The machine learning device 300 checks whether the anti-tampering standard is met (S170), and when the standard is not met, the machine learning device 300 repeats the process of S150 and S160 to perform the learning by modifying the parameters of the learning layer, and establishes the model parameters when the standard is met (S180).

Figure 7:
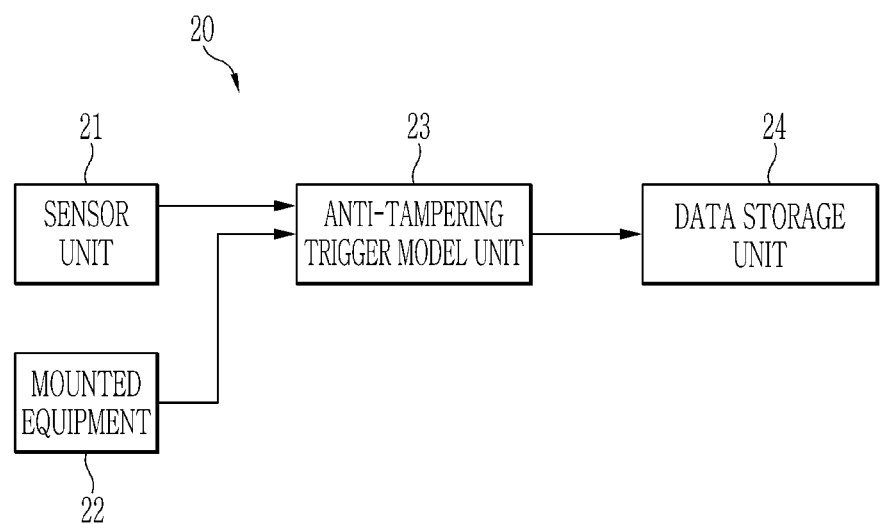
FIG. 7 is a block diagram illustrating an unmanned aerial vehicle equipped with an anti-tampering trigger model designed according to an embodiment of the present disclosure.

FIG. 7 is a block diagram illustrating an unmanned aerial vehicle equipped with an anti-tampering trigger model designed according to an embodiment of the present disclosure.

Referring to FIG. 7, the unmanned aerial vehicle 20 may include a sensor unit 21, a mounted equipment 22, an anti-tampering trigger model unit 23, and a data storage unit 24.

The sensor unit 21 may include various types of sensors mounted on the unmanned aerial vehicle 20. For example, the sensor unit 21 may include various types of sensors such as a GPS, an inertial navigation device, an inertial measurement device, a camera, and a thermometer. The sensor unit 21 may transmit various sensing information for determining the state of the unmanned aerial vehicle to the anti-tampering trigger model unit 23.

The mounted equipment 22 may include a plurality of pieces of equipment that are actually mounted on the unmanned aerial vehicle 20 to perform the operations and functions of the unmanned aerial vehicle. The mounted equipment 22 may transmit data output by all the pieces of equipment that perform the operations and functions of the unmanned aerial vehicle to the anti-tampering trigger model unit 23.

The data storage unit 24 may store all types of data acquired by the unmanned aerial vehicle 20.

The anti-tampering trigger model unit 23 may include the anti-tampering trigger model derived by the anti-tampering trigger system design apparatus 10. The anti-tampering trigger model unit 23 may determine whether to trigger the anti-tampering using the sensing information output from the sensor unit 21 and the data output from the mounted equipment 22 based on the anti-tampering trigger model. When it is determined that the state of the unmanned aerial vehicle 20 may not continue its mission and the return to base is impossible, the anti-tampering trigger model unit 23 triggers the anti-tampering and deletes the data stored in the data storage unit 24.

The drawings and detailed description of the present invention referred to so far are only examples of the present invention, which are only used for the purpose of explaining the present invention, but are used to limit the scope of the present invention described in the meaning or claims. Therefore, it will be understood by those skilled in the art that various modifications and equivalent other embodiments are possible therefrom. Accordingly, an actual technical scope of the present invention is to be defined by a technical spirit of the following claims.

What is claimed is:

1. An anti-tampering trigger system design apparatus, comprising:
    an equipment simulation device comprising:
        a model equipment group that includes a plurality of pieces of model equipment that perform the same function as an actual equipment group that includes a plurality of pieces of actual equipment that are mounted on an unmanned aerial vehicle; and
        a first processor configured to generate driving simulation data by simulating data output by the actual equipment group by using the model equipment group;
    a virtual unmanned aerial vehicle simulation device comprising a second processor configured to generate a function result value by simulating a function of the unmanned aerial vehicle based on the driving simulation data, and generate a mission result value by simulating mission performance of the unmanned aerial vehicle using the function of the simulated unmanned aerial vehicle; and
    a machine learning device comprising:
        an input layer configured to receive the driving simulation data as a plurality of input data;
        a functional layer configured to receive the function result value as the plurality of functions of the unmanned aerial vehicle, the input layer and the functional layer being fully connected; and
        a mission layer configured to receive the mission result value as the mission of the unmanned aerial vehicle, the functional layer and the mission layer being fully connected, the machine learning device being configured to perform machine learning of an anti-tampering trigger using the input layer, the functional layer, and the mission layer.

2. The anti-tampering trigger system design apparatus of claim 1, wherein:
    the first processor is further configured to:
    collect normal data and failure data received from the plurality of pieces of model equipment belonging to the model equipment group; and
    generate the driving simulation data by combining output data of the plurality of pieces of actual equipment belonging to the actual equipment group and the collected information.

3. The anti-tampering trigger system design apparatus of claim 2, wherein:
    each of the plurality of pieces of model equipment is configured to:
    generate the normal data within a range that the actual equipment outputs and output the generated normal data to the failure simulator; and
    generate failure data exceeding the range that the actual equipment outputs and output the generated failure data to the failure simulator.

4. The anti-tampering trigger system design apparatus of claim 3, wherein:
    each of the plurality of pieces of model equipment is further configured to change a value of the failure data generated by the failure simulation unit and output the changed value, and
    the first processor is further configured to transmit data information to be changed according to a request from the machine learning device to corresponding model equipment among the plurality of pieces of model equipment.

5. The anti-tampering trigger system design apparatus of claim 1, wherein:
    the machine learning device is configured to determine whether to use the plurality of input data by adjusting weight values for the plurality of functions and determine whether to use the plurality of functions by adjusting a weight value for the mission.

6. The anti-tampering trigger system design apparatus of claim 1, wherein:
    the machine learning device is further configured to drive an anti-tampering trigger model by repeatedly learning the process of adjusting weight values of the input layer, the functional layer, and the mission layer using a supervised learning method.

7. An anti-tampering trigger system design method for deriving an anti-tampering trigger model, comprising:
    generating driving simulation data by simulating data output by an actual equipment group by using a model equipment group, the actual equipment group including a plurality of pieces of actual equipment that are mounted on an unmanned aerial vehicle, and the model equipment group including a plurality of pieces of model equipment that perform the same function as the actual equipment group;
    generating a function result value by simulating a function of the unmanned aerial vehicle based on the driving simulation data, and generating a mission result value by simulating mission performance of the unmanned aerial vehicle using the function of the simulated unmanned aerial vehicle; and
    performing machine learning of an anti-tampering trigger using the driving simulation data, the function result value, and the mission result value, a machine learning device for the machine learning including an input layer configured to receive the driving simulation data as a plurality of input data, a functional layer configured to receive the function result value as the plurality of functions of the unmanned aerial vehicle, and a mission layer configured to receive the mission result value as the mission of the unmanned aerial vehicle, the input layer and the functional layer being fully connected, and the functional layer and the mission layer being fully connected.

8. The anti-tampering trigger system design method of claim 7, wherein generating the driving simulation data comprises:
generating normal data within a range that actual equipment outputs and failure data that exceeds the range that the actual equipment outputs, and
generating the driving simulation data by combining output data of the plurality of pieces of actual equipment, the normal data, and the failure data.

9. The anti-tampering trigger system design method of claim 8, further comprising:
outputting a change in a value of the failure data according to a request from the machine learning device, and
receiving the changed failure data and re-performing the machine learning of the anti-tampering trigger.

10. The anti-tampering trigger system design method of claim 7, wherein:
the machine learning device is configured to determine whether to use the plurality of input data by adjusting weight values for the plurality of functions and determine whether to use the plurality of functions by adjusting a weight value for the mission.

11. The anti-tampering trigger system design method of claim 7, wherein:
the machine learning device is configured to drive an anti-tampering trigger model by repeatedly learning the process of adjusting weight values of the input layer, the functional layer, and the mission layer using a supervised learning method.

12. An anti-tampering trigger system design method, comprising:
inputting driving simulation data generated by simulating data output by an actual equipment group by using the model equipment group to an input layer of a machine learning model as a plurality of input data, the actual equipment group including a plurality of pieces of actual equipment that are mounted on an unmanned aerial vehicle, and the model equipment group including a plurality of pieces of model equipment that perform the same function as the actual equipment group;
inputting a function result value generated by simulating a function of the unmanned aerial vehicle based on the driving simulation data to a functional layer of the machine learning model as a plurality of functions, the input layer and the functional layer being fully connected;
inputting a mission result value generated by simulating mission performance of the unmanned aerial vehicle using the function of the simulated unmanned aerial vehicle to a mission layer of the machine learning model as the mission of the unmanned aerial vehicle, the functional layer and the mission layer being fully connected; and
deriving an anti-tampering trigger model by repeatedly learning the process of adjusting weights of the input layer, the functional layer, and the mission layer using a supervised learning method.

13. The anti-tampering trigger system design method of claim 12, wherein:
the driving simulation data includes normal data within a range that the actual equipment outputs and failure data that exceeds the range that the actual equipment outputs.

* * * * *